United States Patent
Asokan et al.

(10) Patent No.: US 7,308,431 B2
(45) Date of Patent: Dec. 11, 2007

(54) SYSTEM AND METHOD OF SECURE AUTHENTICATION AND BILLING FOR GOODS AND SERVICES USING A CELLULAR TELECOMMUNICATION AND AN AUTHORIZATION INFRASTRUCTURE

(75) Inventors: Nadarajah Asokan, Espoo (FI); Philip Ginzboorg, Espoo (FI)

(73) Assignee: Nokia Corporation, Espoo (FI)

( * ) Notice: Subject to any disclaimer, the term of this patent is extended or adjusted under 35 U.S.C. 154(b) by 819 days.

(21) Appl. No.: 10/141,879

(22) Filed: May 10, 2002

(65) Prior Publication Data
US 2002/0161723 A1 Oct. 31, 2002

Related U.S. Application Data

(63) Continuation-in-part of application No. 09/659,781, filed on Sep. 11, 2000.

(51) Int. Cl.
*G06Q 99/00* (2006.01)
(52) U.S. Cl. .............................. 705/67; 705/64; 705/65; 705/71; 705/75; 705/76; 713/155; 713/156; 713/176; 713/182; 713/186; 726/2; 726/5; 726/26; 726/30; 726/27
(58) Field of Classification Search ................ 713/150, 713/155, 156, 182–186, 200–202, 176; 705/50–79; 235/379–382.5; 726/2–5, 26–30
See application file for complete search history.

(56) References Cited

U.S. PATENT DOCUMENTS 6,003,135 A 12/1999 Bialick et al.
6,062,472 A * 5/2000 Cheung ...................... 235/380
6,081,518 A 6/2000 Bowman-Amuah (Continued)

FOREIGN PATENT DOCUMENTS

FR 2 779 896 A 12/1999
WO WO 97/45814 12/1997

OTHER PUBLICATIONS

"The GSM System for Mobile Communications", Michel Mouly, et al., pp. 477-498, 1992.

(Continued)

*Primary Examiner*—Jalatee Worjloh
(74) *Attorney, Agent, or Firm*—Foley and Lardner LLP

(57) ABSTRACT

A system, method and computer program for authorizing a mobile station to use a product, service, access or other rights provided by a service provider through the use of digital signatures. These digital signatures are based on a shared signing key, and can be verified using a signature verification service. This system, method and computer program will validate the identity of the mobile station being used utilizing long term keys stored in the mobile station and an authentication center. The system, method and computer program will then utilize the signing key and the signature verification service to verify digital signatures that enable the authorization to access products, services, access or other rights using a mobile station. When this system, method and computer program is used for authorizing payment transactions, the gateway will verify the authenticity of any charges made based on the signatures received. Thus, a user of this system, method and computer program can purchase goods and services without fear of fraud or errors.

24 Claims, 12 Drawing Sheets

U.S. PATENT DOCUMENTS

| | | | |
|---|---|---|---|
| 6,084,969 | A | 7/2000 | Brook et al. |
| 6,516,316 | B1* | 2/2003 | Ramasubramani et al. ..... 707/9 |
| 2003/0140007 | A1* | 7/2003 | Kramer et al. ................ 705/40 |
| 2005/0138363 | A1* | 6/2005 | Fox et al. ................... 713/156 |

OTHER PUBLICATIONS

"Handbook for Applied Cryptography", Alfred J. Menezes, et al., http://www.cacr.math.uwaterloo.ca/hac/, Chapter 9, pp. 321-383, Chapter 13, pp. 543-590.

"3rd Generation Partnership Project; Technical Specification Group Services and System Aspects; 3G Security; Security Architecture (3G TS 33.102 version 3.5.0 Release 1999)", 3GPP, 650 Route des Lucioles—Sophia Antipolis Valbonne—France, http://www/3gpp.org.

European Search Report for Application EP 05 02 4336, dated Nov. 28, 2006.

* cited by examiner

SYSTEM AND METHOD OF SECURE AUTHENTICATION AND BILLING FOR GOODS AND SERVICES USING A CELLULAR TELECOMMUNICATION AND AN AUTHORIZATION INFRASTRUCTURE

RELATED APPLICATIONS

This application is a continuation-in-part (CIP) of application for U.S. patent Ser. No. 09/659,781 filed on Sep. 11, 2000.

FIELD OF THE INVENTION

The invention relates to a system and method of secure authentication and billing for goods and services using a cellular an authentication infrastructure. More particularly, this invention bootstraps an authorization infrastructure so that subscribers of a cellular telecommunication system can buy goods and services from sellers and arrange for payment through the subscriber's telephone bill using a mobile terminal which ensures that errors and fraud do not take place relating to the payment.

BACKGROUND OF THE INVENTION

It has been common for buyers to pay for goods and services using credit and debit cards. The use of credit cards has eliminated the need to carry large amounts of cash in order to pay for these goods and services. Further, the use of a credit card has eliminated the need for car rental agencies and hotels to require large deposits in order to assure return of vehicles or to reserve rooms. Thus, the use of credit cards has facilitated the transacting of business and thus provides a significant convenience to the buyer. However, credit cards have also facilitated the occurrence of fraud and errors in which the customer is double billed for the same item or billed the incorrect amount.

With the explosion in Internet access and usage, an increasing volume of business is occurring between individuals and firms, who have never seen each other, let alone engaged in any prior business transactions. Currently, a typical Internet user would have a browser installed in his local computer or server such as Internet Explorer™ or Netscape™. Using this browser, the user would access an Internet service provider, such as America-On-Line (AOL™), via a modem over the local public switched telephone network (PSTN). Once logged onto the Internet server, the user may utilize one of the many search engines, such as Yahoo™ or Lycos™, to specify search terms. The user may also use a web crawler, spider or robot to attempt to find a product, service or information desired. The search engine or web crawler would then respond with a list of web sites which matched the search terms the user provided. The user would then log onto a web site and view the products or services available for sale. If the user decides to buy the item from the web site, the firm operating the web site would again frequently request a credit card number be entered by the user in order to pay for the product or service. Once the credit card charge is approved, the operator of the web site will then typically ship the item to the user. In the case where the item ordered is digital in format, such as software, graphics, text, video, or music, the item ordered maybe downloaded into the user's PC, server, lap top, palm computer or other processor-based system.

With the advent of cellular phones with and without wireless access protocol (WAP), a user may also "surf" the Internet and order goods and services directly through the WAP-capable phone or a processor-based system connected to the cellular phone in a similar manner as that used with a PC. Thus, a user may order goods and services from anywhere with a cellular phone, satellite phone, or other type of mobile station. Therefore, a person could be sitting in the middle of a remote area, many miles away from another human being, let alone a telephone line, and order a video game from a web site on the other side of the planet and download it into his palm computer connected to a cellular or a standalone WAP or HTML (Hypertext Markup Language) capable phone and play the game on the spot.

However, the user or consumer may not know who is operating the web site and may have a legitimate fear of supplying a credit card number over the Internet to a stranger who may or may not deliver the desired product. Further, the user may be concerned that the agreed upon price will not be the price actually charged to his credit card even when the buyer is dealing directly in a face to face transaction with the seller. In addition, there is also the possibility even in a face to face transaction that the buyer may be double billed for the same item. Also, in an Internet transaction there is no guarantee that the goods will be delivered if the web site operator is less than honest.

Credit card companies have attempted to resolve the issues related to double billing or billing the incorrect amount by providing dispute resolution services in which a customer may challenge a charged amount and the credit card company will launch an investigation. However, such an investigation may take a long time and the buyer is not guaranteed of a satisfactory resolution. In the case of fraud due to a stolen credit card, the credit card company will normally limit liability if the card is promptly reported as stolen. In the case of a debit card, the bank may not be required to limit liability in case of loss or theft.

Other methods utilized to prevent fraud and error in commercial transactions has been through the use of digital signatures that may not be repudiated. In public key systems, an entity called the certification authority (CA) performs two central functions: issuance and revocation of certificates. A certificate is used to connect a name or an authorization, such as permission to make purchases, to a public signature verification key. The certificate is signed by the CA. To verify the certificate an authentic copy of CA's public signature verification key is required. For example, assuming a person or entity has the public key of a certain CA (CA1). This person or entity can verify certificates issued by a certain CA (CA2), only if CA2's public key has been certified by CA1. This type of cross-certification of CAs is referred to as a "public key infrastructure" (PKI). Thus, in order for digital signatures to have widespread usage such digital signatures require the presence of a global PKI which is difficult to develop since it requires contracts and agreements between a large number of parties. Attempts to create such a global PKI system have so far met with failure. Public key certificates and cross certification are discussed in further detail in Section 13.4.2 "public key certificates" and Section 13.6.2 "Trust models involving multiple certification authorities" of *Handbook of Applied Cryptography* by A. J. Menezes et al., CRC Press 1997, ISBN 0-8493-8523-7, which are incorporated herein by reference.

Therefore, what is needed are a system and method which allows a user or consumer to pay for goods and services while ensuring that an hacker or criminal may not listen in or tap into a payment transaction between a legitimate buyer and seller and later use this knowledge to make purchases which are charged to the legitimate user. This system and method should further not allow the legitimate user from repudiating legitimate charges he has made. This system and method should also prevent a seller from forging payment transactions in the name of a legitimate consumer. This system and method should also not require the establishment of a new infrastructure in order to operate properly.

SUMMARY OF THE INVENTION

An embodiment of the present invention provides for a method of authorizing a mobile station to use a product, service, access, or some other right provided by a service provider. This method begins by accessing a gateway by the mobile station and transmitting an identification code to the gateway. It then verifies the identity of the mobile station and the gateway by the gateway accessing an authentication center and comparing variables computed by the mobile station and variables computed by the gateway. This method then requests a digital certificate or an address of a signature verification service by the mobile station from the gateway used for authorizing the mobile station to service providers. A shared key to be used to make and verify digital signatures or a digital certificate containing the user's public key is created. Then an address or a digital certificate is delivered to the mobile station by the gateway when the identity of the mobile station has been verified in which the address is the address of a signature verification service capable of verifying digital signatures made using the mobile station's signing key. The user may then request a product, service, access or a right from a service provider and transmit a digital signature, accompanied by the digital certificate or the signature verification address to the service provider by the mobile station. The service provider then uses the digital certificate to verify the digital signature or accesses the signature verification address and receives verification of the digital signature from the signature verification service.

Further, an embodiment of the present invention creates a system and computer program for ordering, paying for and delivering goods and services using a mobile station. This system and computer program uses a Global Standard for Mobile Communications (GSM) authentication module to verify that the mobile station belongs to a user that can be billed. It also has a mobile station certificate/signature verification address acquisition module to request a digital certificate or signature verification address for the mobile station from a gateway and verify that the gateway is authorized to issue the digital certificate by comparing variables computed by the gateway and the mobile station. The system and method also has a gateway certificate/ signature verification address generation module to verify that the mobile station is authorized. This module also transmits an international mobile subscriber identifier received from the mobile station to an authentication center, and receives information using which it can verify the authenticity of the mobile station by means of a challenge-response protocol. Once verified, this module generates and issues a digital certificate or signature verification address to the mobile station.

These and other features of this device and method will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
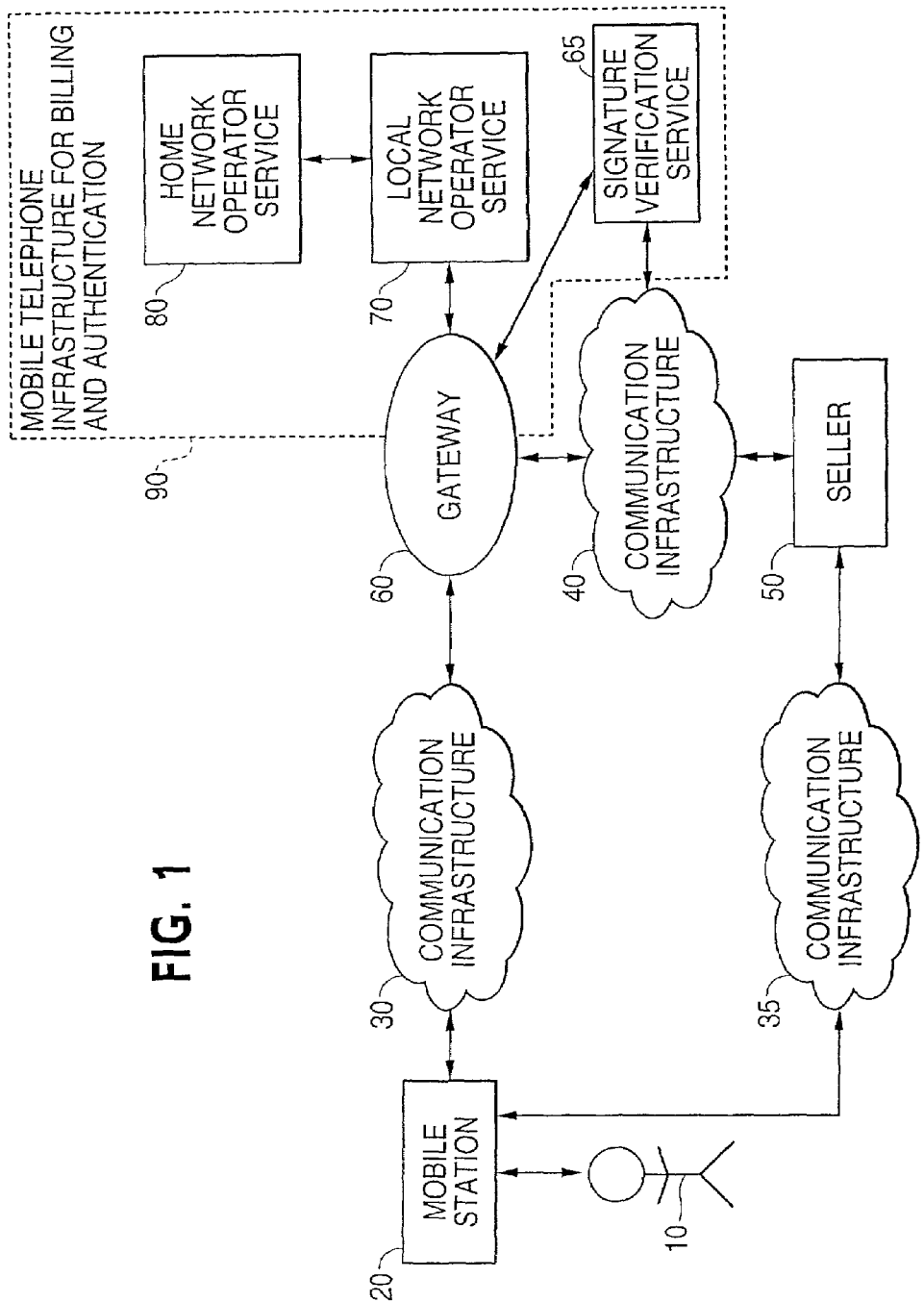
FIG. 1 is an example of an overall system diagram of an embodiment of the present invention.

Before beginning a detailed description of the invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

FIG. 1 illustrates an example of an overall system diagram of an embodiment of the present invention. In this example embodiment a mobile station (MS) 20 acts as an interface for the user, buyer or consumer 10 for access to the present invention. This mobile station (MS) 20 may be a WAP-capable cellular telephone, a Hypertext Markup Language (HTML) capable cellular telephone, or a cellular telephone with a processor-based system connected to it. This processor-based system may be, but not limited to, a laptop computer, palm computer, or other portable computing devices including the WAP-capable telephone alone. The mobile station (MS) 20 communicates through the telecom infrastructure 30 to a local network operator service 70 through a gateway 60. Telecom infrastructure 30 may be, but not limited to, a cellular telephone control protocol, such as GSM (Global System for Mobile Communications) telephony system, and internet protocol (IP) over wireless local area network (LAN) or any other suitable access protocol. The interface between the mobile station 10 and the seller 50 is through communications infrastructure 35 which may be, but not limited to, a direct physical connection, short range radio frequency (RF) connection, an IP connection, or any other suitable means of communication. In turn the seller 50 may communicate to the gateway 60 and thus the local network operator service 70 through, but not limited to, an internet protocol packet-switched network, a dial-up line over the public switched telephone network, or any other suitable means of communications. Therefore, the embodiments of the present invention are not limited to communications using the Internet. Further, the local network operator service 70 may communicate to the buyer's 10 home network operator service 80 directly through the PSTN or via the Internet. In addition, the home network operator service 80, the local network operator service 70, a gateway 60, signature verification service 65 are all considered part of the mobile telephone infrastructure for billing and authentication 90 which serves to facilitate the purchase of goods and services.

In FIG. 1 it should be noted that the assumption is made that user 10 is not within the home network operator service 80 area. However, the embodiments of the present invention will operate when the user 10 is in the home network operator service 80 area and thus the home network operator service 80 and the local network operator service 70 may be one and the same entity.

When the user or consumer 10 is not in his home network operator service 80 area, the user 10 may still make purchases from seller 50 if a roaming agreement exists between the local network operator service 70 and the home network operator service 80. Further, the seller 50 may be anyone selling a good or service from a street flower vendor to a department or clothing store. The seller 50 may also be a seller of software or other digital products and may have a store front or may have a web site on the Internet 40. The only restriction on the seller 50 is that he be permitted by the local network operator service 70 to accept digital certificates and use them to verify digital signatures made on behalf of the buyer 10, or have access to the signature verification service 65, the address of which maybe supplied through a buyer 10, and submit them to the local network operator service 70 for payment. If the user or buyer 10 is outside of his home network operator service 80 area, the local network operator service 70 will submit an accounting record of the transaction between buyer 10 and seller 50 to the user's 10 home network operator service 80 for billing on the user's 10 telephone bill.

Still referring to FIG. 1, using the present invention it is possible for a buyer 10 to utilize mobile station 20 similarly to a credit card to pay for goods and services wherever the user's home network operator service 80 has established a roaming agreement with the local network operator service 70. As with the major credit cards, this could someday be worldwide if a universal cellular phone standard is established. As will be discussed ahead, the use of the present invention eliminates the possibility of double billing a buyer 10 for a product or service or submitting an incorrect price for payment for a particular good or service. Further, since digital signatures cannot be forged by any party that do not have access to the signing key, and since the signing key is never released outside the mobile station 20, it would be impossible for a third party eavesdropper, hacker, criminal, or the seller to either undetectably modify payment messages generated by a legitimate payer, or generate bogus payment messages purportedly coming from a legitimate payer. In addition, the buyer or user 10 may utilize mobile station 20 wherever his home network operator service 80 has established a roaming agreement and his mobile station 20 can interface to the local network operator service 70. However, the embodiments of the present invention are not limited to the purchase and sale of goods and services. For example, any right or ability associated with a cellular telephone may be enabled or disabled utilizing the present invention. This may include, but not limited to, the right or ability for a sender to transmit a message to a particular mobile station 20, determination of the location of a mobile station 20, activation or deactivation of the mobile station, etc.

Still referring to FIG. 1, as will be discussed in further detail ahead, the signature verification service 65 may effectively take the place of a certificate in an alternate embodiment of the present invention. A seller 50 may receive the address of the signature verification service 65 from a mobile station 20 along with a message authentication code (MAC) based digital signature. This address may take the form of a universal resource locator (URL) that would direct the seller 50 to possibly gateway 60 and possibly a specific directory for the mobile station 20. The signature verification service 65 would then verify the signature on behalf of seller 50. Therefore, in the case where seller 50 receives a certificate it is the seller 50 that authenticates the digital signature, but if the seller 50 receives a signature verification service 65 address then it is the signature verification service 65 that authenticates the digital signature based upon the use of MAC keys.

A discussion will now be supplied involving the logic employed in the embodiments of the present invention. Specifically, a discussion will be provided of the flowcharts and diagrams illustrated in FIGS. 2 through 11 and the modular configuration diagram provided in FIG. 12. The flowcharts and diagrams shown in FIGS. 2 through 12, as well as the modular configuration diagram shown in FIG. 12 contain operations that correspond, for example, to code, sections of code, instructions, firmware, hardware, commands or the like, of a computer program that is embodied, for example, on a storage medium such as floppy disk, CD Rom, EP Rom, hard disk, etc. Further, the computer program can be written in any language such as, but not limited to, for example C++.

Embodiments of the present invention use the GSM (Global System for Mobile Communications) telephony system that employs algorithms in the mobile station (MS) 20, such as, but not limited to, cellular phones and WAP-capable cellular phones, and the a mobile telephone infrastructure for billing and authentication 90 which controls authentication of the user 10 and mobile station 20 to prevent unauthorized access to the network and to provide encryption of the transmissions between users. The GSM System is described in depth in the publication, "The GSM System for Mobile Communications" by Mouly and Pautet, Copyright 1992, which publication is incorporated herein by reference in its entirety. Security features of the GSM system are described in pages 477 through 498 of the Mouly and Pautet text. Further detail of the GSM system security is provided in ETSI publication TS 100 929 V.6.1.0 (1999) entitled "Digital cellular telecommunications system (Phase 2+); Security related network functions" (GSM 03.20 version 6.1.0 Release 1997), which is incorporated herein by reference in its entirety. The usage of the GSM system in the present invention will be discussed in further detail in relation to the FIGS. 2-12 and in particular to FIG. 4. However, it should be noted that any other GSM like system may be used that authenticates a mobile station 20 for access to a telecom infrastructure 30.

Figure 2:
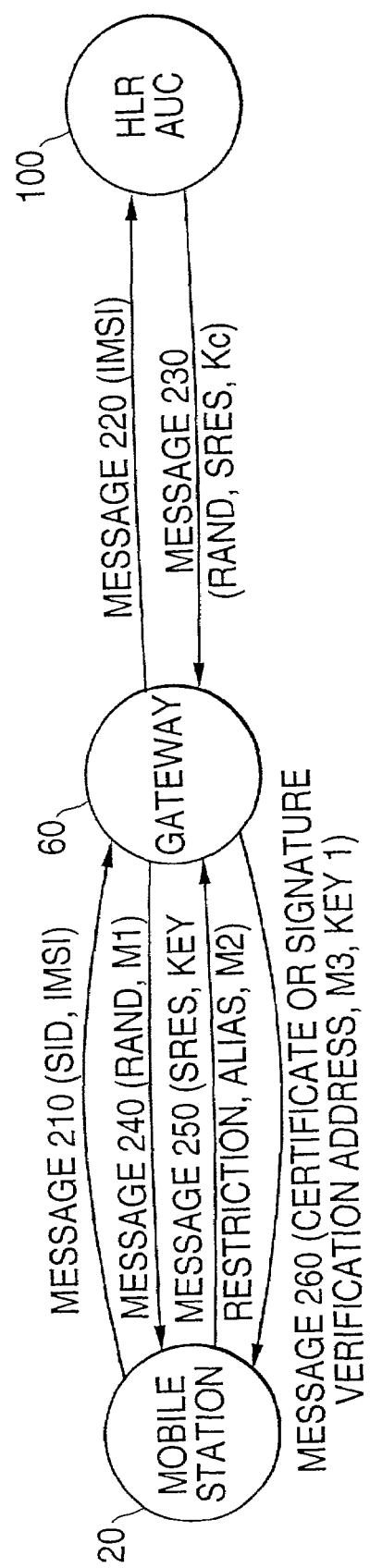
FIG. 2 is a diagram of the messages passed between a mobile station, a gateway, and a home location register (HLR) that contains or is connected to an authentication center (AUC) so that the buyer maybe authenticated and ultimately receive a certificate or signature verification address which may be used to purchase goods and services.

FIG. 2 is a diagram of the messages passed between a mobile station 20, a gateway 60, and a home location register (HLR) authentication center (AUC) located in the home network operator service 80. In the following discussion, curly brackets { } indicate a set of one or more items, and square brackets [ ] indicate an optional item. The messages 210 through 260 enable mobile station 20, and thus a buyer 10, to receive a digital certificate which enables the buyer 10 to purchase and pay for goods and services from seller 50. A total of four messages are exchanged between mobile station 20 and gateway 60, while two messages are exchanged between gateway 60 and HLR/AUC 100. These messages will be discussed in further detail in reference to FIGS. 3 and 5. However, to summarize, message 210 is transmitted from mobile station 20 to gateway 60 and contains a session identification (SID) and an international mobile subscriber identifier (IMSI). The IMSI is a unique identification number supplied for each mobile station 20 by the home network operator service 80 upon initial signing of a contract for service. The SID is a number assigned by the mobile station 20 and used to identify this particular session. The gateway 60 in turn stores the SID and IMSI in its local memory and transmits the IMSI in message 220 to the HLR/AUC 100 contained within home network operator service 80. The gateway 60 is able to identify which HLR/AUC 100 it needs to transmit the IMSI to based on information contained within the IMSI. As will be discussed in further detail in reference to FIG. 4, the HLR/AUC 100 responds with message 230 containing a random number (RAND) 410, a signed response (SRES) 450, and an encryption key (Kc) 400. The gateway 60 takes the Kc 400 and uses it to compute an integrity key (K) based on the formula K=f ({Kc}), where f is a cryptographic one-way hash function known both to the gateway 60 and to the mobile station 20. The gateway 60 would then store the SID, IMSI, RAND 440, SRES 450 and K in a single record in the gateway's 60 memory. Thereafter, message 240 is sent from the gateway 60 to the mobile station 20 and contains RAND 440 and M1. M1 is computed based upon a message authentication code (MAC) function using integrity key (K) And RAND 440. The formula used is represented as M1=MAC (K, {RAND}). The purpose of a MAC is to facilitate, without the use of any additional mechanisms, assurances regarding both the source of a message and its integrity. MACs have two functionally distinct parameters, a message input ({RAND}) and a secret key (K). MAC functions are discussed in further detail in sections 9.5 "keyed hash functions (MAC's)" and 9.6.3 "Data Integrity Using MAC Alone" of *Handbook of Applied Cryptography* by A. J. Menezes et al., CRC Press 1997, ISBN 0-8493-8523-7, which are incorporated herein by reference. Upon receipt of the RAND 440 and M1 variables, the mobile station 20 computes SRES 450 and Kc 400 based on RAND 440 and secret key (Ki) 410. Ki 410 is a secret key installed by the home network operator service 80 in the mobile station 20 upon signing up for a service plan. The mobile station 20 also computes the integrity key (K) using the formula K=f({Kc}). The computation of Kc 400 is discussed in further detail in reference to FIG. 4.

Still referring to FIG. 2, mobile station 20 responds to the receipt of message 240 by the generating message 250 and transmitting message 250 to gateway 60. Message 250 includes SRES 450, a key (an optional public or shared), any restrictions, an alias, and M2. The Key, provided by mobile station 20, is used in verifying digital signatures made by the user 10 which act as authorizations or approvals for charges made in the purchase of goods and services. Both the restrictions and alias are optional items. Restrictions refer to limitations on transactions that may be placed. For example, user or buyer 10 may be protected from a loss or theft of mobile station 20 by limiting the amount of any given purchase, the number purchases that can be made within a particular time frame, or the time period within which the key is valid. The alias is an alternate identification for the mobile station 20. M2 is computed based upon another MAC function utilizing the variables K, SRES 450, key, restrictions, and the alias. The specific formula for computation of M2 is M2=MAC(K, {SRES}, key, [{restrictions}], [alias]). Upon receipt of message 250, the gateway 60 generates a digital certificate and stores in a record in memory the SID, IMSI, f (RAND, SRES, K), Key (public or shared), restrictions, alias, and digital certificate. Thereafter, the gateway 60 constructs the contents (C) of message 260 and computes M3 which is based on formula M3=MAC(K, C). In this embodiment, the contents (C) comprise the digital certificate. Then in message 260, the gateway 60 transmits the message 260 containing the digital certificate, M3 to the mobile station 20. The digital certificate may then be used to purchase goods and services from seller 50.

In an alternate embodiment of the present invention, the digital signatures may be based on message authentication codes (MACs). MACs are based on a key shared between a signer and a verifier. In this example embodiment the signer is the mobile station (MS) 20. The verifier is a network entity represented in FIG. 1 as the signature verification service 65. When MAC-based signatures are to be used, the messages exchanged in FIG. 2 must result in a shared signing key (SK) between the MS 20 and the signature verification service 65. This signing key (SK) can be constructed in two ways. It can be computed from the integrity key (K) that is known to both parties after a successful authentication of the mobile station 20, or it may be chosen by either of the parties, or jointly by both parties. In this example embodiment of the present invention, the necessary key material must be transported as part of messages 250 and 260. When key material is transported in a message, that message must also have confidentiality protection.

For example, in an example preferred embodiment where the mobile station 20 chooses the signing key (SK,) it will send key (SK) in the Key parameter of message 250. In this case the contents (C) of message 260 comprises the signature verification address. An alternative embodiment is the case where the network or signature verification service 65 chooses signing key (SK), it will send SK in message 260. In this case the contents (C) of message 260 comprises the signature verification address, and the key1 (SK). In the case where signing key (SK) is chosen jointly, the mobile station 20 will choose a partial key (S1) and send it in the Key parameter of message 250. Thereafter, the gateway 60 or signature verification service 65 will choose a partial key (S2) and send it in message 260. In this case the contents (C)

of message 260 comprises the signature verification address, and the partial key (S2). At this point, both parties will compute signing key (SK) as f(S1,S2), where f(.,.) is a standard two-parameter function known a priori to both parties. For example, this can be the bitwise-XOR function.

In the case where signing key (SK) is computed from the integrity key (K), messages 250 and 260 will not contain any key material, but merely an indication that the signing key (SK) is to be computed from the integrity key (K). After exchanging messages 250 and 260, both parties will compute signing key (SK) as g(K) where g is a standard randomized function known a priori to both parties. For example, this can be a MAC function with a standard constant as parameter and K as the key: e.g.,SK=MAC(K, 0).

In still another alternate embodiment of the messages shown in FIG. 2, it is possible to enhance security of the present invention by encrypting the IMSI in message 210 using a public key supplied by the gateway 60 or some other server. In this manner it is less likely that the IMSI would be intercepted by a third party.

In a still further alternate embodiment of the messages shown in FIG. 2, it is possible to have the SID jointly selected by the mobile station 20 and the gateway 60. In this manner, tracking of the certificate in message 260 and associating it to the SID may be simplified for the gateway 60.

In another alternate embodiment of the messages shown in FIG. 2, it is possible to drop the SRES 450 in message 250 since it is already required to generate a correct M2.

In another embodiment of the messages shown in FIG. 2, it is possible for the HLR to compute the integrity key (K) and send it as part of message 230 to the gateway. In this case, as an alternative embodiment, instead of the integrity key (K) computed as a function of the set of encryption key (Kc) 400, it may be computed directly from the secret key (Ki) 410 and the random number (RAND) 440.

In another embodiment of the messages shown in FIG. 2, the Key may be a long term Key stored in the authentication center (AUC). In this case, Key is included in message 230, and need not be included in message 250.

In still another embodiment of the messages shown in FIG. 2, the public key the local network operator service 70 (denoted as PK_G) can be included in message 260. This allows the mobile station 20 to verify certificates or signature verification addresses that were issued by the operator to other entities such as sellers 50. It also allows the mobile station 20 to verify certificates that were issued to other mobile stations 20, thereby allowing the first mobile station 20 to act as a seller. Therefore, a mobile station 20 may act in one instance as a buyer and in the next instance as a seller. This would be most suitable when the product being sold is a digital product. However, any good or service may be sold this way.

Figure 3:
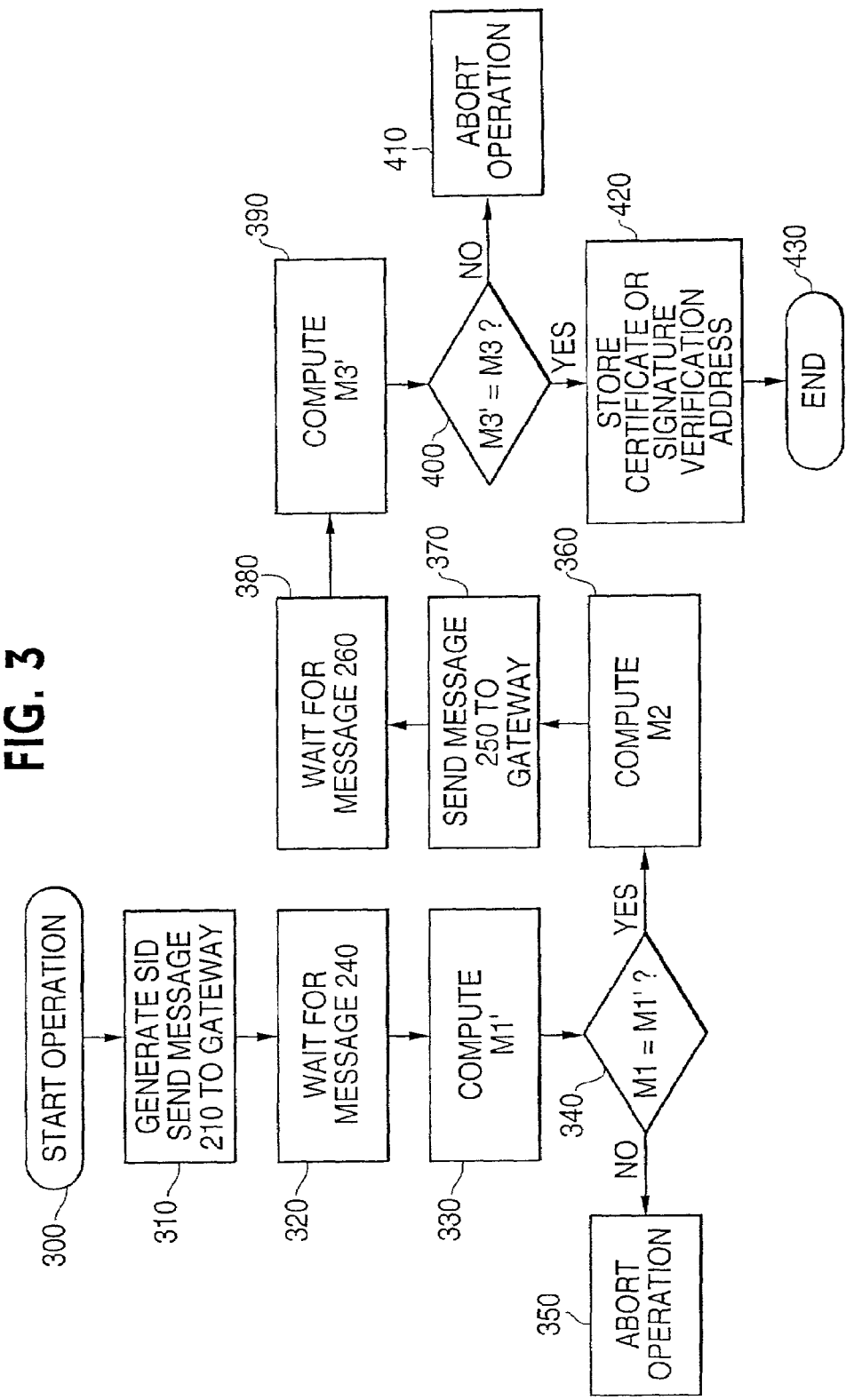
FIG. 3 is a flowchart of the mobile stations certificate acquisition module shown in FIG. 12 as utilized in an embodiment of the present invention.
Figure 4:
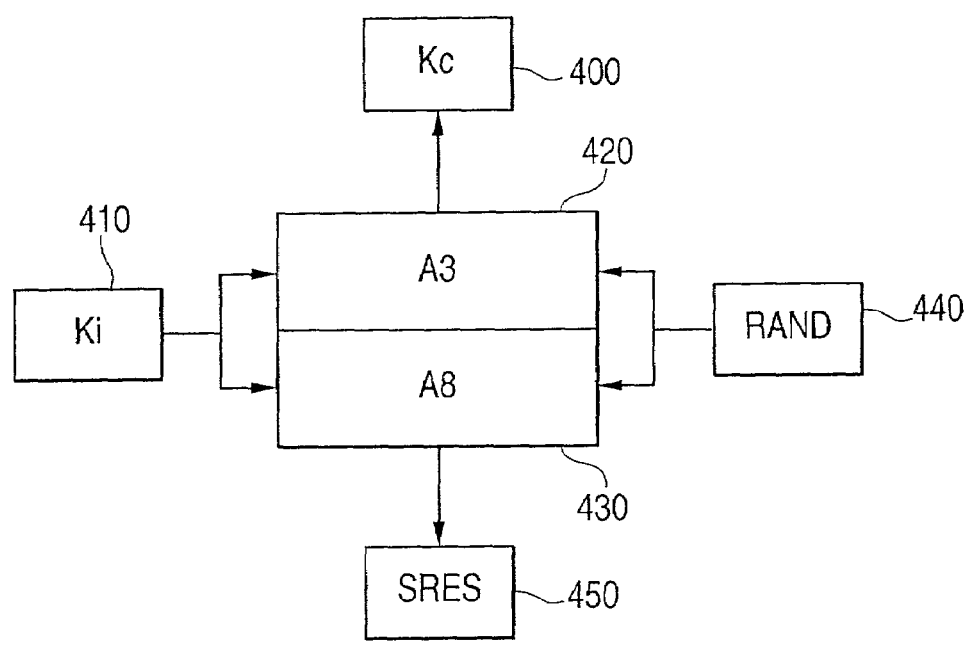
FIG. 4 is diagram showing a Global Standard for a Mobile (GSM) communications authentication algorithm used in the example embodiments of the present invention.
Figure 5:
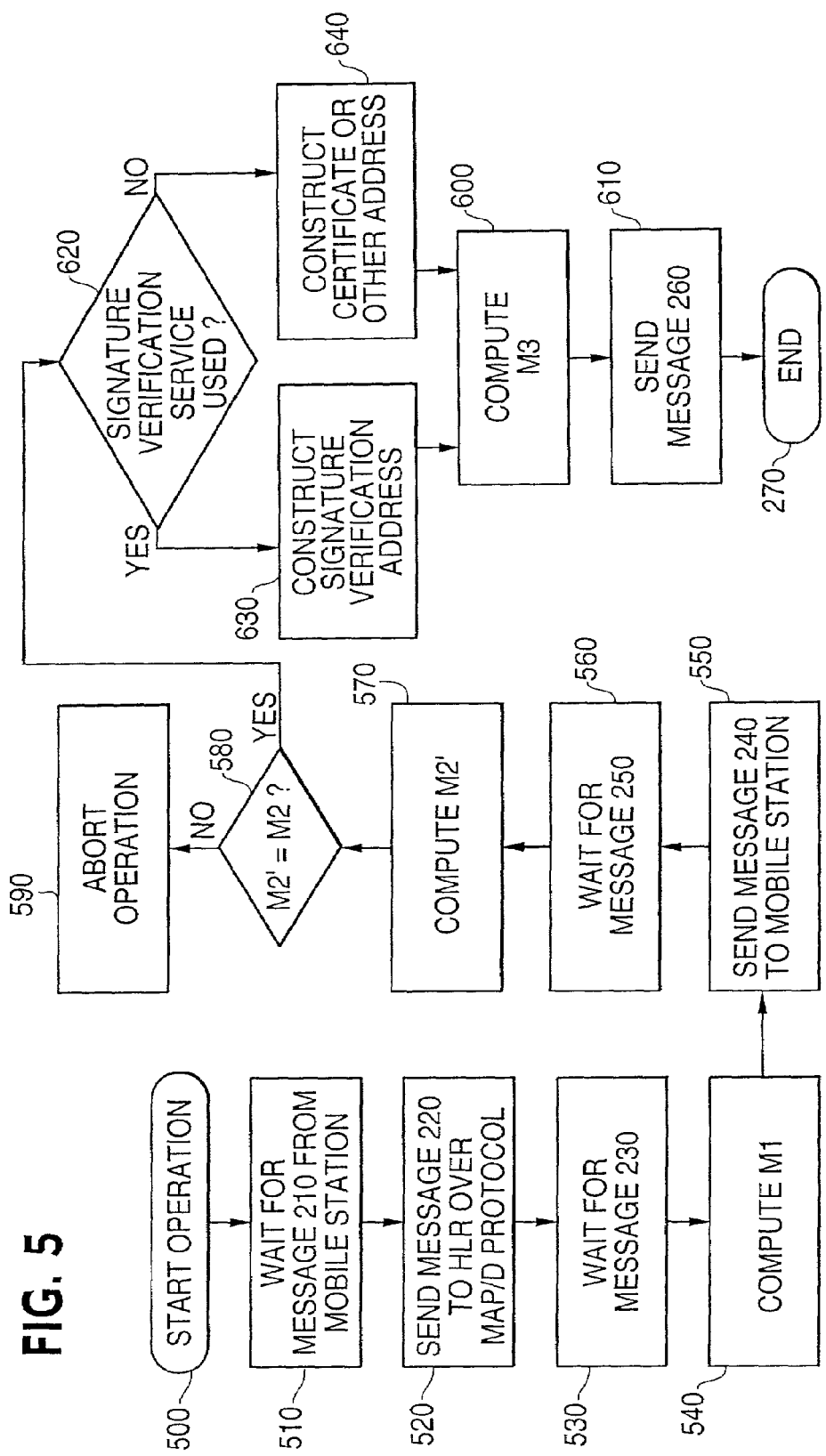
FIG. 5 is a flowchart of the gateway certificate generation module shown in FIG. 12 as utilized in an embodiment of the present invention.

A discussion will now be provided for FIGS. 3 through 5 detailing the exchange of messages as shown in FIG. 2. FIG. 3 is a flowchart of the mobile station certificate/signature verification address acquisition module 1500 shown in FIG. 12. The mobile station certificate/signature verification address acquisition module 1500 is used to generate messages 210 and 250 shown in FIG. 2. The mobile station certificate/signature verification address acquisition module 1500 also receives and processes messages 240 and 260 from a gateway 60, as shown in FIG. 2. The mobile certificate/signature verification address acquisition module 1500 includes operations 300 through 430 shown in FIG. 3.

Referring to FIG. 3, the mobile station certificate/signature verification address acquisition module 1500 begins execution in operation 300 and immediately proceeds to operation 310. In operation 310, a SID is generated which is a unique number identifying a session. In addition, the IMSI representing the international mobile subscriber identifier is retrieved and along with the SID is transmitted to gateway 60 in message 210. Thereafter, in operation 320, the mobile station 20 will wait for receipt of message 240 from gateway 60. Upon arrival of message 240, processing will then proceed to operation 330. As previously discussed, message 240 contains a random number (RAND), and M1. M1 was computed by the gateway 60 utilizing an integrity key (K) and a random number (RAND) received from the HLR/AUC 100. In operation 330, mobile station 20 computes M1'. M1' is computed in the same manner by the mobile station 20 as M1 was computed by gateway 60 with the exception that encryption key (Kc) 400 is contained within the mobile station 20 itself and is used to compute integrity key (K). Utilizing the same formula used by the gateway 60, the mobile station 20 is able to compute M1'. The formula utilized is M1'=MAC(K, {RAND}). Therefore, in operation 340 a comparison is made between M1 received from gateway 60 and M1' computed by the mobile station 20. This comparison is done in order to assure the mobile station 20, and thus user 10, that the source of message 240 is a legitimate portion of the GSM system. If M1 is not found to equal M1' in operation 340, then processing proceeds to operation 350 where execution of the mobile station certificate/signature verification address acquisition module 1500 is aborted and processing terminates. If operation 350 is executed the assumption is that message 240 has been corrupted or that a gateway 60 is being impersonated by an unauthorized individual.

Still referring to FIG. 3, if M1=M1', then processing proceeds from operation 340 to operation 360. In operation 360, M2 is computed. As previously discussed, M2 is computed based upon a MAC function utilizing the variables K, SRES 450, Key, restrictions, and the alias. The specific formula for computation of M2 is M2=MAC(K, {SRES}, Key, [{restrictions}], [alias]). Thereafter, message 250 is generated containing SRES, Key, restrictions, alias, and M2 and is transmitted to gateway 60. In operation 380 the mobile station 20 waits for receipt of message 260 from gateway 60. Upon receipt of message 260 from gateway 60 processing then proceeds to operation 390. In operation 390, M3' is computed as previously discussed above in reference to FIG. 2. M3' is computed in the same manner as M3 was computed by the gateway 60 based on formula M3=MAC (K, C) with the exception that encryption key (Kc) 400 is contained within the mobile station 20 itself and is used to compute integrity key (K). Thereafter, processing proceeds to operation 400 where M3' is compared against M3 received in message 260 from gateway 60. If it is determined in operation 400 that M3' does not match M3, then processing proceeds to operation 410. In operation 410, processing of the mobile station certificate acquisition/signature verification address module 1500 is terminated. When M3' does not match M3, it is assumed that message 260 has been corrupted or that an unauthorized individual is impersonating a gateway 60. However, if M3' does match M3 in operation 400, then processing proceeds to operation 420. In operation 420, the certificate or signature verification address received in message 260 is stored in the memory of mobile station 20. In the embodiments described above where the gateway 60 or the signature verification service 65 plays a role in the selection of the signing key (SK), message 260 may contain key material necessary to compute signing key (SK) as already described. In this case operation 420 also comprises computing the signing key (SK). This certificate or signature verification address may be used, within any associated restrictions, for the purchasing of goods and services from seller 50. Thereafter, processing for the mobile station certificate/signature verification address acquisition module 1500 terminates in operation 430.

FIG. 4 further details authentication in a GSM network performed by the generation of a signed response (SRES) 450 by both the mobile station (MS) 20 and the home network operator service 80 and gateway 60 which is a function of a unique secret key (Ki) 410 of the mobile station 10 and a random number (RAND) 450 as used in the logic shown in FIGS. 3 and 5. The signed response (SRES) 450 is calculated in a subscriber identification module (SIM) (not shown) located in the mobile station (MS) 20, based on Ki 410 inside the SIM and RAND 440 obtained from the network authentication center (AUC) (not shown) in the home network operator service 80. Additionally, the mobile station (MS) 20 and the authentication center in the home network operator service 80 each generate a ciphering key (Kc) 400 which is a function of the same random number RAND 440 and the secret key (Ki) 410 of the mobile station 20. This authentication process is a two stage process which employs two algorithms. The first algorithm, which calculates SRES 450, is known as the A3 algorithm module 420 and the second, key generation, algorithm which computes Kc 400, which is computed each time a mobile station 20 is authenticated, is known as the A8 algorithm module 430. However, each of the operations of authentication and computing of the ciphering key (Kc) 400 requires the mobile station (MS) 20 to be programmed to perform the aforementioned computations.

Still referring to FIG. 4, the mobile switching center (not shown) located in the local network operator service 70 authenticates the mobile station 20 whenever a new mobile station (MS) 20 registers with the mobile telephone infrastructure for billing and authentication 90 and whenever a registered mobile station (MS) 20 turns on the power. Authentication in a GSM system is based on a secret key (Ki) 310 that is shared by the home network operator service 80 and the subscriber and which is different for each subscriber. The home network operator service 30 keeps the key Ki 410 in the AUC and the subscriber has Ki 410 installed within SIM card of the mobile station 20, which he receives from the home network operator service 80 when the subscription contract is made. To protect the secrecy of Ki 410, the SIM is made so that the mobile station (MS) 20 cannot directly access the value of Ki 410, and can only initiate certain computations in the SIM that use Ki 410 and then receive the results of those computations. Similarly, the elements of the mobile telephone infrastructure for billing and authentication 90, such as home location register (HLR) cannot access subscribers' keys Ki 410 directly. These network elements may only request from the AUC a result of computations that use Ki 410 as discussed above. These computations are an A3 algorithm module 420 and an A8 algorithm module 430 and are identical in the SIM of the mobile station (MS) 20 and in the AUC in the home network operator service 80.

The foregoing mentioned GSM authentication process is a two stage process. In the first stage of GSM authentication, a local network operator service 70 element, which is typically a MSC/VLR (Mobile services Switching Center/Visitor Location Register), receives an International Mobile Subscriber Identifier (IMSI) from the mobile station (MS) 20 and requests from the AUC of the home network operator service 80 one or more triplets. These triplets are composed of RAND 440, SRES 450, and Kc 400. This process begins by the mobile station 20 sending an International Mobile Subscriber Identifier (IMSI) to MSC/VLR in the local network operator service 70. The MSC/VLR then requests authentication triplet(s) (RAND 440, SRES 450, and Kc 400) from the AUC in the home network operator service 80. The AUC, in the home network operator service 80, computes one or more triplets (RAND 440, a SRES 450, and a Kc 400) and sends them to the MSC/VLR in the local network operator service 70.

In the second stage of GSM authentication, the MSC/VLR of the local network operator service 70 authenticates the mobile station (MS) 20 by the MSC/VLR in the local network operator service 70 sending to mobile station 20 an authentication request (RAND) in which the message contains a RAND 140. The MS 20 then sends to the SIM, contained within MS 20, a run GSM algorithm (RAND) request message which again contains RAND 440. In operation 260, MS 20 sends to the SIM a get response message. Thereafter, the SIM replies with a response having a SRES 450 and Kc 400. Then MS 20 stores Kc 400 in the SIM by sending to the SIM a write (Kc) request in which the message contains Kc 400. The MS 20 sends to MSC/VLR a Radio Interface Layer 3, Mobility Management (RIL 3-MM) protocol authentication response in which the SRES 450 is contained in the message. After receiving the message the MSC/VLR, in the local network operator service 70, compares SRES 450 that it has received from the AUC in the home network operator service 80, in stage one of GSM authentication discussed the SRES 450 received from the MS 20. If the values of the SRES 450 are determined not to be identical then authentication fails and service is not established. However, if the values are identical then authentication succeeds and service is established for the MS 20.

Figure 12:
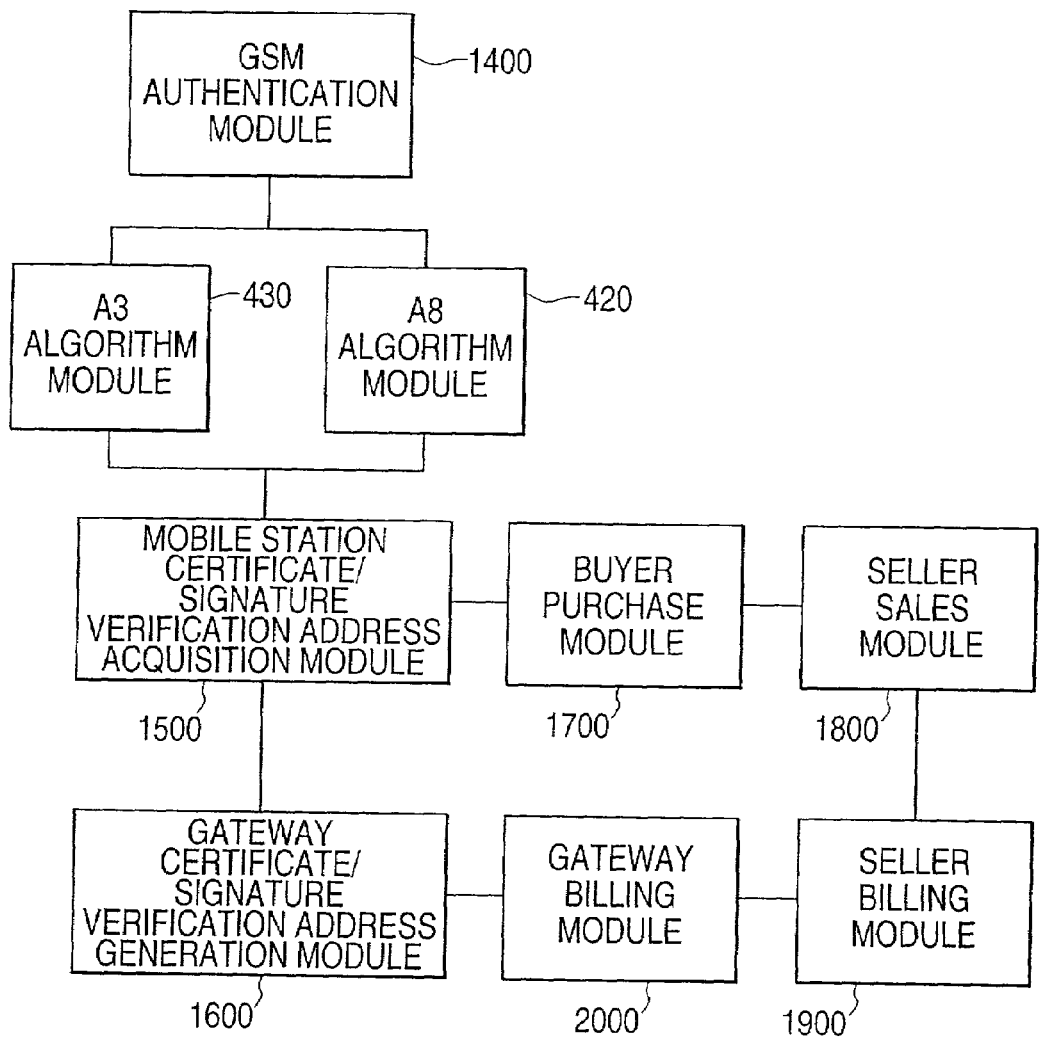
FIG. 12 is a modular configuration diagram of the embodiments of the present invention shown in FIGS. 3-5, 7, 8, 10, and 11.

FIG. 5 is a flowchart of the gateway certificate generation/signature verification address module 1600, shown in FIG. 12, as utilized in an embodiment of the present invention. The gateway certificate generation module 1600 is the counterpart of the mobile station certificate/signature verification address acquisition module 1500 and serves to generate a digital certificate or construct a signature verification address required by buyer 10 in order to make purchases from seller 50. The gateway certificate generation module 1600 begins execution in operation 500 and immediately proceeds with operation 510. In operation 510, the gateway 60 awaits transmission of message 210 from mobile station 20. Upon receipt of message 210 from mobile station 20, the gateway 60 stores in local memory the SID and IMSI contained in message 210 and processing proceeds to operation 520. In operation 520, the gateway 60 generates message 220 containing the received IMSI. Based on IMSI, the gateway 20 knows which HLR/AUC the mobile station 20 is associated with and can thereby transmit message 220 thereto. Thereafter, processing proceeds to operation 530 where the gateway 60 waits for the receipt of message 230 from the HLR/AUC 100. The HLR/AUC 100 upon receipt of message 220 will reply with one or more triplets. These triplets contain RAND 440, SRES 450, and Kc 400. The gateway 60 will then proceed to compute M1 in operation 540 as previously discussed. M1 is computed based upon a message authentication code (MAC) function using integrity key (K) And RAND 440. The formula used is represented as M1=MAC(K, {RAND}). Integrity key (K) is computed based on Kc 400 received from HLR/AUC 100 using the formula K=f({Kc}). Processing them proceeds to operation 550 where message 240 is generated and transmitted to mobile station 20. As previously discussed, message 240 contains RAND 440 and M1. Thereafter, processing proceeds to operation 560 where the gateway 60 waits for message 250 from mobile station 20. Upon receipt of message 220 processing proceeds to operation 570 where M2' is computed. M2' is computed based upon a MAC function utilizing the variables to K, SRES 450, PK, restrictions, and the alias. The specific formula for computation of M2' is M2'=MAC(K, {SRES}, Key, [{restrictions}], [alias]). Processing then proceeds to operation 580 where a comparison is made between M2, received in message 250, and M2' computed by gateway 60. If M2' and M2 do not match then processing proceeds to operation 590 where the execution of the gateway certificate/signature verification address generation module 1600 is aborted. However, if M2' and M2 match then processing proceeds to operation 620. In operation 620, a determination is made whether signature verification service 65 is to be used. If signature verification service 65 used to be used in then processing proceeds to operation 630 where a signature verification address for mobile station 20 is constructed with and the signature verification service 65. In the embodiments in which the gateway 60 or signature verification service 65 plays a role in the computation of the signing key (SK), operation 630 further includes computing the key material to be sent to the MS 20. However, if the signature verification service 65 is not to be used, then processing proceeds to operation 640 where the certificate is constructed or other suitable address is given. Thereafter, processing proceeds from either operations 630 or 640 to operation 600, M3 is computed by the gateway 60. The gateway 60 computes M3 based on the formula M3=MAC(K, C). In operation 610, message 260 containing the certificate or the signature verification address, optionally key material to be used by the MS 20 in the computation of the signing key (SK) and M3 are transmitted to the mobile station 20. Thereafter, processing terminates for the gateway certificate/signature verification address generation module 1600 in operation 270.

Figure 6:
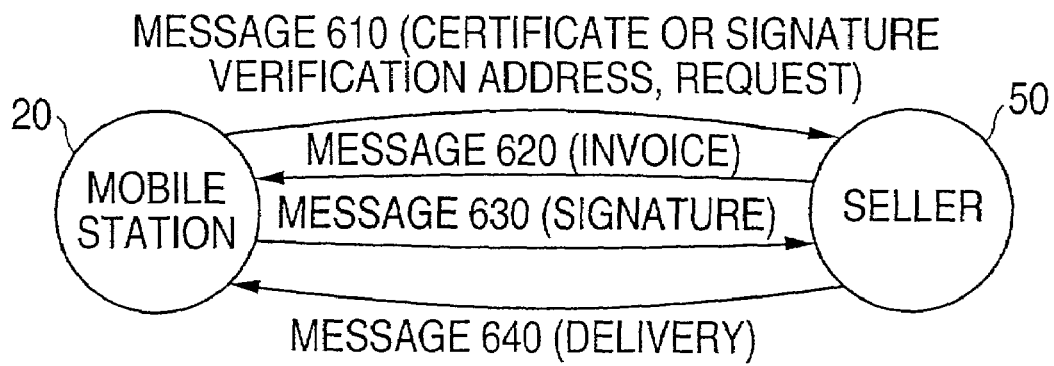
FIG. 6 is a diagram of the messages that pass between the mobile station and the seller in order to facilitate the purchase and payment of goods and services as utilized in an example embodiment of the present invention.
Figure 7:
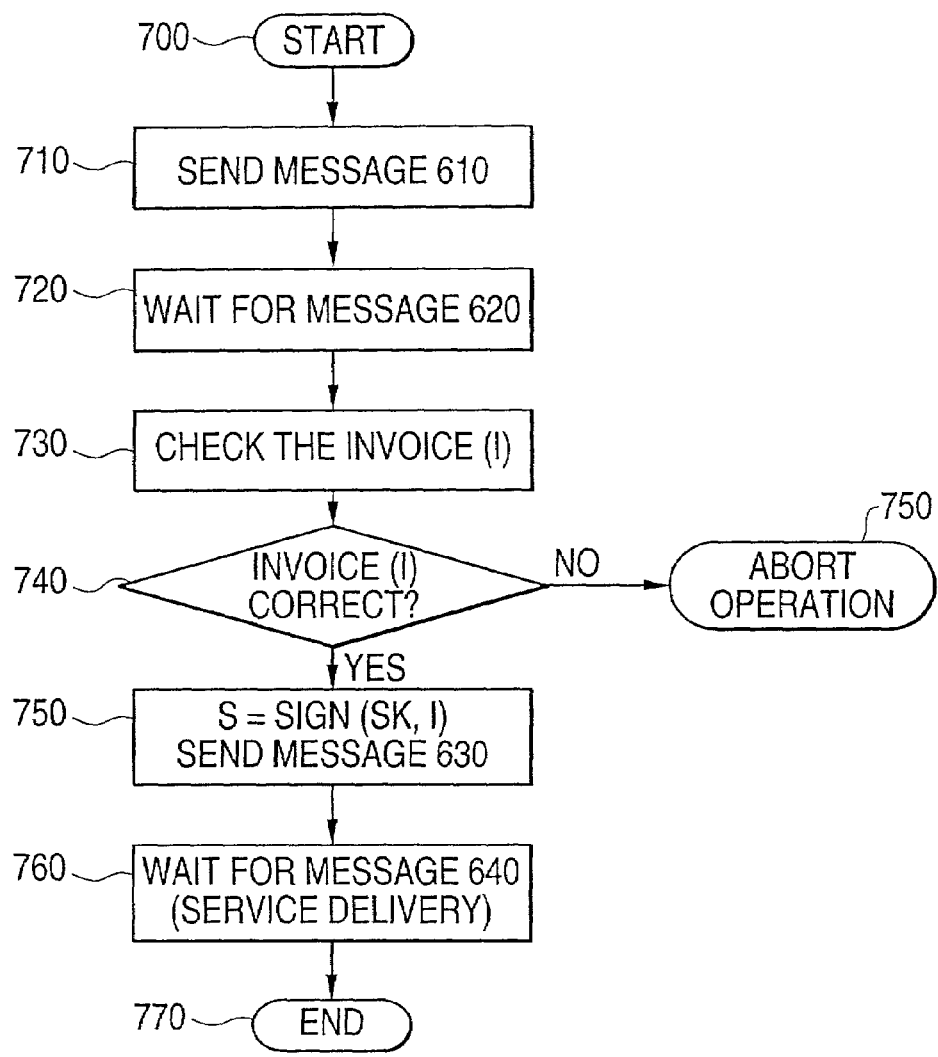
FIG. 7 is a flowchart of a buyer purchase module shown in FIG. 12 as utilized by an embodiment of the present invention.
Figure 8:
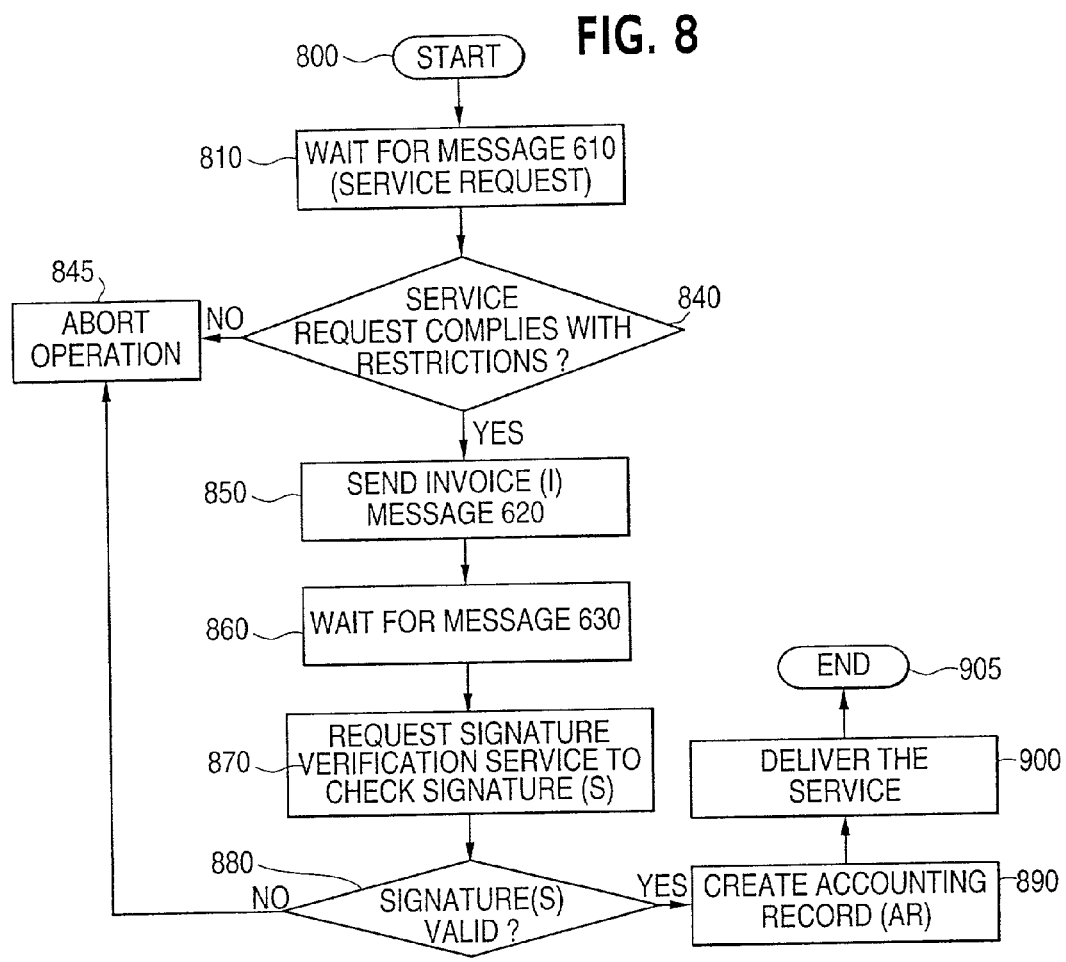
FIG. 8 is a flowchart of the seller sales module, shown in FIG. 12, as utilized by an embodiment of the present invention.

Upon termination of the mobile station certificate/signature verification address acquisition module 1500 along with its counterpart, gateway certificate/signature verification address generation module 1600, the mobile station 20 has in its possession a certificate or signature verification address 65 which buyer 10 may use to purchase goods and services from seller 50. FIGS. 6 through 8 illustrate the processing involved by the embodiment of the present invention in order for buyer 10 to make purchase from seller 50.

FIG. 6 is a diagram of the messages passed between the mobile station 20 and the seller 50 in order to facilitate the purchase and payment of goods and services as utilized in an example embodiment of the present invention. A total of two messages are sent by the mobile station 20 to seller 50. The messages sent from mobile station 20 to seller 50 include message 610 and message 630. Seller 50 in turn respond with message 620 and message 640. Message 610 contains a certificate or signature verification address 65 received from gateway 60 and a request for a particular product or service. Message 620 is an invoice transmitted from seller 50 to mobile station 20. This invoice serves to notify buyer 10 through mobile station 20 of the price of the item requested. The invoice contains a seller-specific unique transaction identifier, chosen by the seller 50, and the identity of the seller 50, as assigned by the gateway 60. Message 630 includes a digital signature that serves to authorize charging the price of the invoice against the certificate supplied. Message 640 includes the delivery of the product to the mobile station 20. In the foregoing discussion of messages 610 through 640 it has been assumed that the product or service requested is in digital format that could be downloaded to mobile station 20. However, as previously discussed the product or service an individual buyer 10 may request may be anything including such tangible items as flowers and clothing. In the case where the product is a tangible item and buyer 10 and seller 50 face each other, then the request may take the form of an oral request and the delivery may take the form of handing over the flowers or other product.

In an alternate embodiment of the message configuration shown in FIG. 6, it is possible for message 610 to contain the request only, and message 630 to contain both the signature and the certificate or signature verification address 65. In this manner the seller sales module 1800, discussed in detail ahead, verifies the certificate or signature verification address 65 and signature at the same time.

In a further alternate embodiment of the message configuration shown in FIG. 6, it is possible to charge for use of a product, such as a software based game, by the time of usage and not for mere delivery of the product. One method for implementing this would be for several messages 620 to be sent to the mobile station 20 at periodic time intervals. For example, if buyer 10 requests a game and it is downloaded, an initial invoice would be sent, after which a new invoice will be sent every five minutes.

FIG. 7 is a flowchart of a buyer purchase module 1700 shown in FIG. 12 as utilized by an embodiment of the present invention. The buyer purchase module 1700 includes operations 700 through 770 shown in FIG. 7. When a buyer 10 initiates a purchase of an item from seller 50, the buyer purchase module 1700 begins execution in operations 700 and immediately proceeds to operation 710. In operation 710 the mobile station 20 transmits message 610 to seller 50. The mode of transmission may be any form of digital communications. Thus, if the seller 50 is a web site, then mobile station 20 would access seller 50 through the cellular access network, via a gateway (such as a WAP gateway), and then through the Internet. However, if a face-to-face transaction is occurring between buyer 10 and seller 50 then communications between mobile station 20 and seller 50 may include any short range form of communications including cable, infrared, low-power radio frequency, or any other suitable means.

Still referring to FIG. 7, in operation 720 mobile station 20 will wait for receipt of message 620 from seller 50. Upon receipt of message 620 processing then proceeds to operation 730. In operation 730 the buyer 10 checks the invoice price to determine if it is valid. In operation 740, a determination is made whether invoice (I) is correct. If invoice (I) is not correct processing proceeds to operation 750 where processing of the buyer purchase module 1700 is terminated. However, if the invoice (I) is correct then processing proceeds to operation 750. In operation 750, the buyer 10 digitally signs the invoice using a secret key (SK) 410 and the signature is returned in message 630. Thereafter, processing proceeds to operation 760 where mobile station 20 awaits delivery of message 640. In the case where the product being delivered by seller 50 is a digital product, operation 760 would be executed. However, where the product being delivered is a tangible product, such as a basket of flowers, operation 760 may simply be the handing over that product to buyer 10 from seller 50. Thereafter, the buyer purchase module 1700 terminates execution in operation 770.

FIG. 8 is a flowchart of the seller sales module 1800, shown in FIG. 12, as utilized by an embodiment of the present invention. The seller sales module 1800 is counterpart to the buyer purchase module 1700 and is utilized to check the validity of the digital certificate or signature verification address 65 received from the buyer purchase module 1700.

Referring FIG. 8, the seller sales module 1800 includes operations 800 through operation 905. The seller sales module 800 begins execution in operation 800 and immediately proceeds to operation 840. In operation 840, it is determined whether the requested service complies with the optional restrictions applied. If the requested service does not comply with restrictions then again processing proceeds to operation 845 where execution of the seller sales module 1800 terminates. However, if the restrictions are violated, then processing proceeds to operation 850. In operation 850, the invoice (I) is sent in message 620 to mobile station 20. In operation 860, the seller sales module 1800 waits for receipt of message 630. Upon receipt of message 630 containing signature (S), operation 870 checks the signature (S). Thereafter, in operation 880, a determination is made if signature (S) is valid. If the signature (S) is not valid then processing again proceeds to operation 845 where the seller sales module 1800 is terminated. However, if the signature (S) is valid, processing proceeds to operation 890 where the seller 50 creates an accounting record (AR) and stores it in the seller's 50 local database. Thereafter, processing proceeds to operation 900 where the seller 50 proceeds to deliver the product or service desired. This may be done through the transmission of message 640 where the product is a digital product. Finally, the seller sales module 1800 terminates execution in operation 905.

Figure 9:
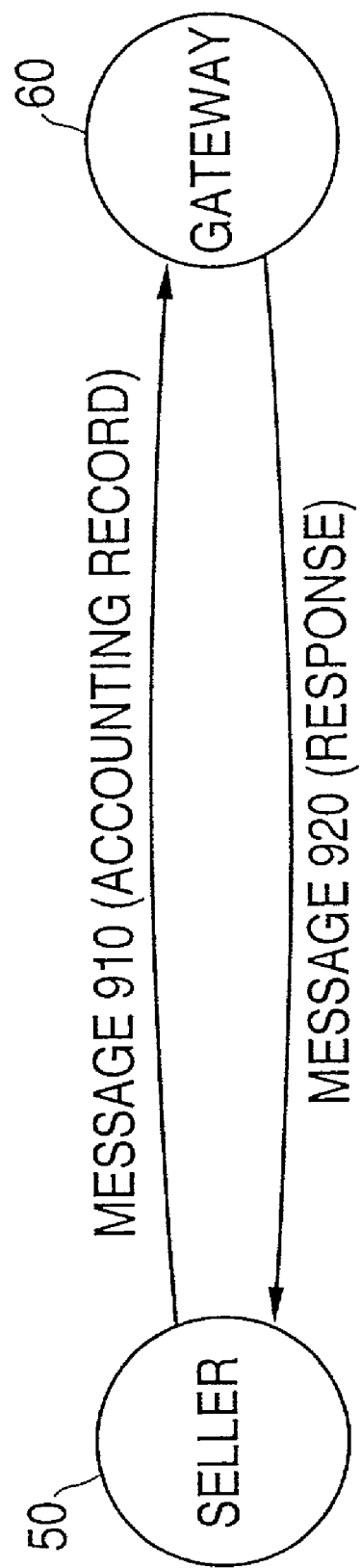
FIG. 9 is a diagram of the messages passed between the seller and the gateway in order to facilitate payment to the seller for services and goods provided the buyer in an example embodiment of the present invention.
Figure 10:
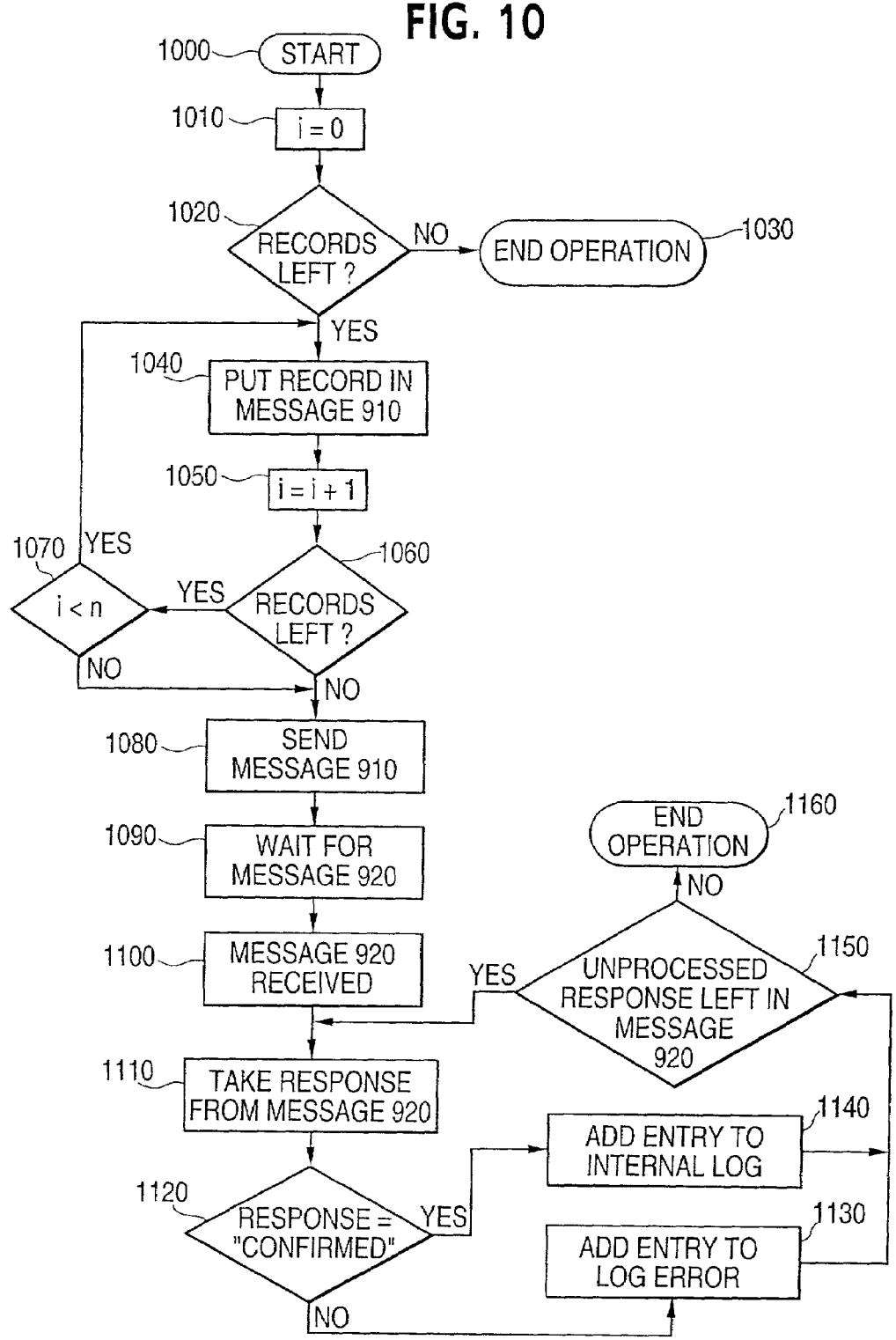
FIG. 10 is a flowchart of the seller billing module, shown in FIG. 12, as utilized in an example embodiment of the present invention.
Figure 11:
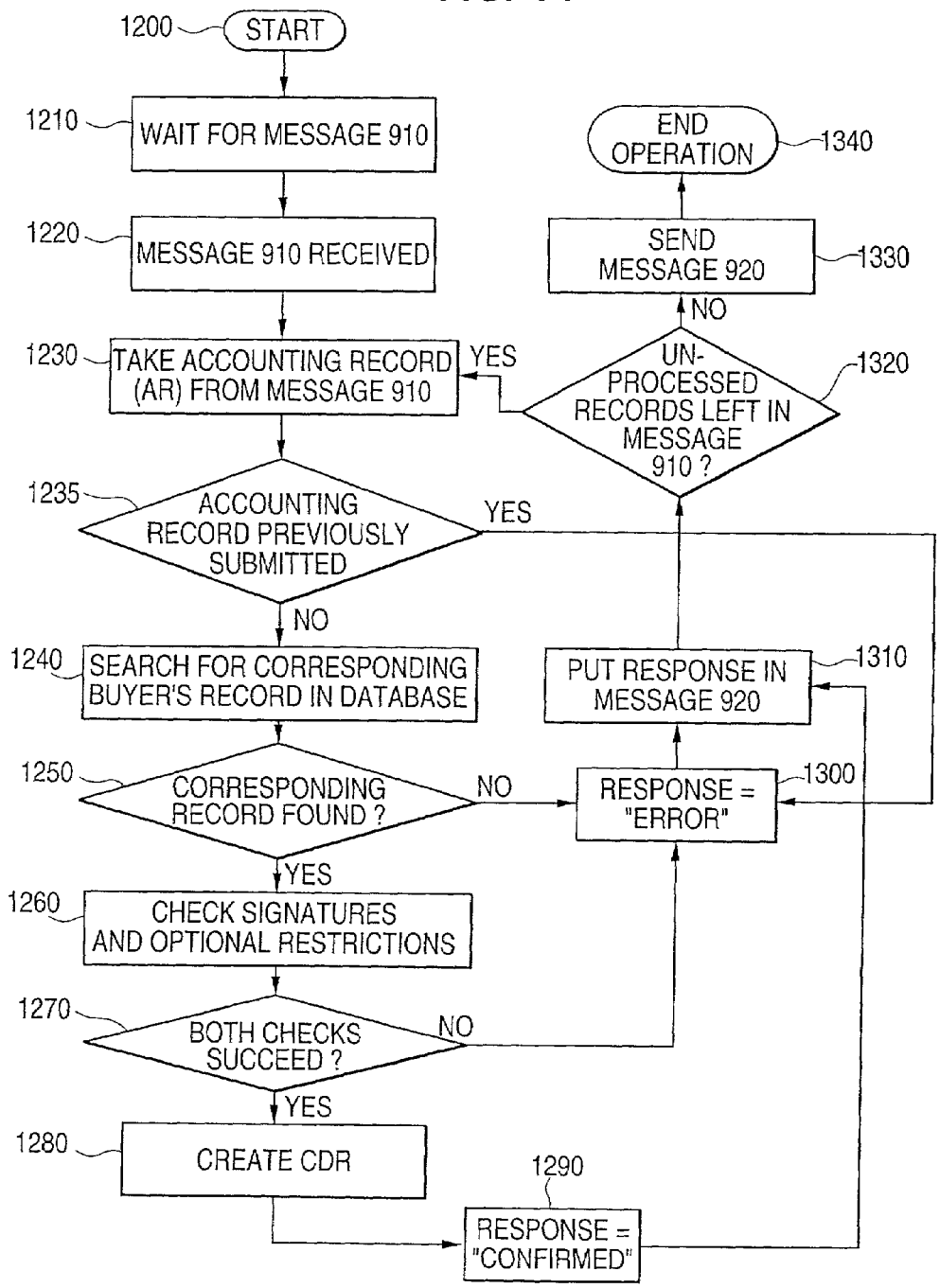
FIG. 11 is a flowchart of the gateway billing module, shown in FIG. 12, as utilized in an example embodiment of the present invention.

FIGS. 9 through 11 illustrate the process whereby the seller 50 is able to receive payment for products and services sold using the embodiment of the present invention.

FIG. 9 is a diagram of the messages passed between the seller 50 and the gateway 60 in order to facilitate payment to the seller for services and goods provided to the buyer 10 in an example embodiment of the present invention. Only two messages are exchanged between seller 50 and gateway 60. Message 910 simply contains the current records accumulated by seller 50 within a finite period of time. However, as would be appreciated by one of ordinary skill in the art, each time an accounting record is generated it may be transmitted to gateway 60. Message 920 is a response supplied by gateway 60 to seller 50 indicating acceptance or rejection of the accounting records transmitted.

FIG. 10 is a flowchart of the seller billing module 1900, shown in FIG. 12, as utilized in an example embodiment of the present invention. The seller billing module 9000 includes operations 1000 through 1160 shown in FIG. 10. The seller billing module 9000 begins execution in operation 1000 and immediately proceeds to operation 1010. In operation 1010, variable i is set to 0. In operation 1020 a determination is made if any records remain that have not been incorporated into message 910. If no records are left then processing proceeds to operation 1030 where the seller billing module 1900 terminates execution. However, if no accounting records remain to be processed then processing proceeds to operation 1040 or they are placed in message 910. Thereafter, in operation 1050 i is incremented by 1. In operation 1060, a determination is made if any records remain to be processed. If records remain to be processed then processing proceeds operation 1070. In operation 1070, it is determined whether the variable i is less than the variable n which represents the maximum number of accounting records that may be put in message 910. If i is less than n then processing loops back to operation 1040 for further processing. However, if i is not less than n, then processing proceeds to operation 1080. In operation 1080 message 910 containing the accounting records is sent to seller 50. Thereafter, processing proceeds to operation 1090 where seller 50 awaits return of message 920 from gateway 60. Upon receipt of message 920 processing proceeds to operation 1110. In operation 1110, the responses from gateway 60 are accepted. In operation 1120, it is determined whether the response received indicates confirmation and thus an approval of the accounting record and payment thereof. If the responses are not confirmed in operation 1120, processing proceeds to operation 1130 where the accounting record is added to the error log. The error log would then be examined at some later point in time to determine the proper course of action. However, if the response equals a confirmation, then processing proceeds to operation 1140 where the accounting record is entered into a local internal log. Thereafter, in both the case of operation 1130 and 1140, processing proceeds to any unprocessed responses left in message 920. If there are any unprocessed responses, then processing loops back to operation 1110. However, if all responses have been processed, then processing proceeds to operation 1160 where execution of the seller billing module 1900 is terminated.

FIG. 11 is a flowchart of the gateway billing module 2000, shown in FIG. 12, as utilized in an example embodiment of the present invention. The gateway billing module 2000 is utilized to credit seller 50 with funds for purchases made by buyer 10 using mobile station 20. The gateway billing module 2000 also serves to verify the existence of a corresponding buyer's record corresponging to the digital certificate or signature verification address 65 created by gateway certificate/signature verification address generation module 1600. Further, the gateway billing module 2000 also verifies the validity of the signature generated by the buyer purchase module 1700. As will be discussed in further detail ahead, using the verification of the digital certificate or signature verification address 65 and the signature it is possible to insure that the buyer 10 is paying the correct amount for the purchase and that the buyer 10 is only being billed once.

The gateway billing module 2000 includes operations 1200 through 1340 shown in FIG. 11 and begins execution in operation 1200. The gateway billing module 2000 upon startup in operation 1200 immediately proceeds to operation 1210. In operation 1210, the gateway billing module 2000 waits for the transmission and arrival of message 910 from the seller billing module 1900. In operation 1220, the message 910 is received from the seller 50 and processing proceeds to operation 1230. In operation 1230, an accounting record (AR) is extracted from message 910. Processing then proceeds to operation 1235 where it is determined whether this particular accounting record has previously been submitted. If the accounting record has previously been submitted then processing proceeds to operation 1300 were an error response is generated. However, if this particular accounting record has not been previously processed, then processing proceeds to operation 1240. In operation 1240, the gateway 60 database is searched to find a corresponding record of the digital certificate or signature verification address 65 relating to this transaction. In operation 1250 a determination is made whether a record has been found. If no record is found then processing proceeds to operation 1300 where an error response for this particular accounting record is stored for transmission in message 920 to seller 50.

However, if a corresponding record is discovered then processing proceeds to operation 1260.

Still referring to FIG. 11, the gateway billing module 2000, executing on gateway 60, proceeds to perform the second check to determine if the accounting record is correct. In operation 1260, the signature of buyer 10 is checked either using the certificate or using the signature verification address 65. Further, the associated restrictions for the digital certificate or signature verification address 65 are checked to determine if this accounting record violates any of these restrictions. In operation 1270, if either signature cannot be verified or if any restrictions are violated then processing proceeds to operation 1300 where an error response for this particular accounting record is stored for transmission in message 920. However, if the signature is verified and the restrictions are not violated then processing proceeds to operation 1280. In operation 1280, a call detailed record (CDR) is stored in the gateway 60 database so that at some later time the seller 50 may be paid for all purchases by buyer's 10 for that period of time. Further, the call detailed report is also charged to the buyer's 10 account for that period of time. In GSM network this is done by sending the CDR from local operator to the home operator; the home operator then adds the transaction indicated in that CDR to buyer's phone bill. Thereafter, in operation 1290, the response for this accounting record is confirmed and stored as such for transmission in message 920 to the seller 50. Thereafter, processing proceeds from both operations 1290 and 1300 to operation 1310 where either a confirmed response or an error response is placed in the message 920. In operation 1320, it is determined if other accounting records remain in message 910 and need to be processed. If accounting records remain unprocessed in message 910 then processing loops back to operation 1230. However, if all accounting records have been processed then processing proceeds to operation 1330. In operation 1330, message 920 containing all responses to all the accounting records is transmitted to the seller 50 and processing for the gateway billing module terminates in operation 1340.

It should be noted that the seller billing module 1900 and the gateway billing module 2000 processed accounting records in a batch operation. However, as would be appreciated by one of ordinary skill in the art, an accounting record may also be transmitted from the seller 50 to the gateway 60 as they are generated in the seller sales module 1800. Such of an approach would increase the traffic between the seller 50 and gateway 60.

FIG. 12 is a modular configuration diagram of the embodiments of the present invention shown in FIGS. 5, 7, 8, 10, and 11. This modular configuration diagram illustrates the interconnection between modules in the present invention and the logical flow. It should be noted that the mobile station 20 certificate/signature verification address acquisition module 1500 is the only module that interfaces to the GSM authentication module 1400, the A3 algorithm module 430 and the A8 algorithm module 420, previously discussed in reference to FIG. 4. Using this embodiment of the present invention, the mobile station 20 need only be authenticated by the mobile telephone infrastructure for billing and authentication 90 upon startup and thus imposes a minimal burden upon the telecom mobile telephone infrastructure for billing and authentication 90.

Still referring to FIG. 12, once the mobile station 20 is authenticated the mobile station certificate/signature verification address acquisition module 1500 is able to obtain a digital certificate or signature verification address 65 from the gateway 60 using the gateway certificate/signature verification address generation module 1600. The gateway certificate/signature verification address module 1600 may also aid the seller sales module 1800 in verifying the digital signatures sent by the mobile stations 20. With the certificate or signature verification address 65 in the memory of mobile station 20 the buyer purchase module 1700 is able to make a purchase from a seller 50 in conjunction with the seller sales module 1800. The seller sales module 1800 generates an accounting record that the seller billing module 1900 is able to submit to the gateway 60. The gateway billing module 2000 in the gateway 60 will verify the accuracy of the accounting record and only charge the buyer 10 for the correct amount and only once for any purchase.

While we have shown and described only a few examples herein, it is understood that numerous changes and modifications as known to those skilled in the art could be made to the present invention. For example, rather than a single digital certificate or signature verification address 65 being transmitted in message 260, several could be transmitted at one time. In this manner each certificate may have its own restrictions and when a buyer or user 10 goes to make a purchase the certificate or signature verification address 65 that most closely meets the requirements of the purchase may be transmitted to the seller 50. In addition, instead of transmitting messages containing M1, M2, and M3 as shown in FIG. 2 it is possible for all messages to be authenticated using an integrity key (K) that is part of the third generation standard security mechanism as specified in section 6.5 "Access Link Data Integrity" of 3G security document (3G TS 33.102 version 3.5.0 release 1999) which we incorporate herein by reference. Therefore, we do not wish to be limited to the details shown and described herein, but intend to cover all such changes and modifications as are encompassed by the scope of the appended claims.

We claim:

1. A method for authorizing a mobile station to use a product, service, access, or some other right provided by a service provider, comprising:
   accessing a gateway by the mobile station and transmitting an identification code to the gateway;
   verifying the identity of the mobile station by the gateway accessing an authentication center and comparing variables computed by the mobile station and variables computed by the gateway;
   creating a shared signing key;
   delivering a signature verification address to the mobile station by the gateway when the identity of the mobile station has been verified, wherein a signature verification service at said address is capable of verifying digital signatures using the shared signing key;
   requesting a product, service, access or a right from the service provider and transmitting a digital signature, accompanied by the signature verification address to the service provider by the mobile station; and
   accessing the signature verification address by the service provider and verifying the digital signature.

2. The method recited in claim 1,
   wherein legitimacy of the gateway is verified by the mobile station by comparing the variables computed by the gateway with the variables computed by the mobile station, comprising: transmitting from the mobile station to the gateway a session identification and an international mobile subscriber identifier; transmitting the international mobile subscriber identifier from the gateway to the authentication center; transmitting from the authentication center to the gateway a random number (RAND), a signed response (SRES), and an encryption key; computing a variable M1 by the gateway and transmitting the variable M1 and the random number to the mobile station; computing a variable M1' by the mobile station; and verifying the legitimacy of the gateway when the variable M1 equals the variable M1'.

3. The method recited in claim 2, further comprises: computing an integrity key (K) by both the mobile station and the authentication center as a function of RAND and Ki, where RAND is a random number issued by the authentication center, and Ki is a secret key contained within the authentication center and the mobile station.

4. The method recited in claim 1, wherein the shared signing key (SK) is either generated by the mobile station and transmitted to the gateway, or generated by the gateway and transmitted to the mobile station, or a portion of the shared signing key (SK) is generated by both the mobile station and the gateway and exchanged.

5. The method recited in claim 3, wherein the shared signing key (SK) is computed based from the integrity key (K).

6. The method recited in claim 1, further comprising:
constructing by the gateway a signature verification address and transmitting the signature verification address to the mobile station;
computing a variable M3 by the gateway and transmitting the variable M3 and the signature verification address to the mobile station;
computing a variable M3' by the mobile station; and
verifying the legitimacy of the gateway when the variable M3 equals the variable M3'.

7. The method recited in claim 6, wherein the variables M3 and M3' are computed using the formula M3=M3'=MAC(K, C), where MAC is a message authentication code function, K is an integrity key and C is data contained in the message by which the signature verification address is delivered to the mobile station.

8. The method recited in claim 1, wherein verifying the identity of the mobile station by the gateway accessing an authentication center and comparing variables computed by the mobile station and variables computed by the gateway, further comprises:
transmitting a signed response, a public key and a variable M2 computed by the mobile station to the gateway;
computing a variable M2' by the gateway;
comparing the variable M2 and the variable M2'; and
verifying the identity of the mobile station when variable M2 is equal to variable M2'.

9. The method recited in claim 8, wherein variables M2 and M2' are computed using the formula M2=M2'=MAC(K, {SRES}, Key,), wherein MAC is a message authentication code function, SRES is a signed response, K is an integrity key, Key is the shared signing key SK or a partial key to be used in the computation of signing key SK, restrictions are limits on the use of signatures made with the signing key SK and alias is an alternate identification for the mobile station.

10. The method recited in claim 1, wherein the requesting of a product, service, access or right from the service provider and transmitting the digital signature, accompanied by the signature verification address as payment or authorization to the service provider further comprises:
transmitting the signature verification address with the request for the product or service;
receiving an authorization request from the service provider describing the product, service, access or right;
computing a digital signature on the authorization request;
approving the authorization request by transmitting the digital signature to the service provider; and accepting delivery of the product or service by the mobile station.

11. The method recited in claim 10, wherein the service provider upon transmission of the digital signature:
verifies the digital signature by a seller contacting the signature verification service and the signature verification service verifying the digital signature;
verifies, by the signature verification service, that restrictions associated with the use of signatures made with the signing key SK are not violated; and
creates an accounting record for the product, service, access, or right delivered.

12. The method recited in claim 11, further comprising:
transmitting from the service provider to the gateway the accounting record having an authorization request and digital signature of a customer of a home network operator service;
determining by the gateway that a corresponding record exists in a local database and the validity of the digital signature;
determining whether the authorization request violates any restrictions contained in the corresponding record;
crediting the service provider with an amount equal to that in the authorization request; and
billing the mobile subscriber with the amount of the authorization request.

13. The method recited in claim 1, further comprising:
verifying the legitimacy of the gateway by the mobile station by comparing the variables computed by the gateway with the variables computed by the mobile station.

14. The method recited in claim 1, wherein delivering a signature verification address to the mobile station by the gateway when the identity of the mobile station and the gateway have been verified, further comprises:
requesting a signature verification address by the mobile station from the gateway.

15. A system for ordering, paying for and delivering goods and services using a mobile station, comprising:
a Global System for Mobile Communications (GSM) mobile communication authentication module to verify that the mobile station is permitted to access a telecom infrastructure;
a mobile station certificate/signature verification address acquisition module to request a signature verification address for the mobile station from a gateway; and
a gateway certificate/signature verification address generation module to verify that the mobile station is authorized to receive the signature verification address by transmitting an international mobile subscriber identifier received from the mobile station to an authentication center, calculate variables based on information received from the authentication center and compare them to variables computed by the mobile station, and issue the signature verification address to the mobile station when the variables match.

16. The system recited in claim 15, wherein the mobile station certificate/signature verification address acquisition module verifies that the gateway is authorized to issue the signature verification address through the use of comparing variables computed by the gateway and the mobile station.

17. The system recited in claim 16, further comprising:
a buyer purchase module to request the purchase of a good or service from a seller, present signature verification address to the seller, receive an invoice and provide the seller with a digital signature approving the purchase of the good or service;

a seller sales module to verify the validity of the signature verification address and the validity of the digital signature, issue an invoice, generate an accounting record and deliver a product or service;

a seller billing module to transmit to the gateway the accounting record and receive a response indicating if the accounting record has been approved for payment; and a gateway billing module to verify the accounting record and an accompanying signature, and issue a credit to the seller and debit to the buyer when the accounting record and the accompanying signature are verified.

18. The system recited in claim 17, wherein the gateway certificate/signature verification address generation module transmits an international mobile subscriber identifier to the authentication center, receives a random number, a signed response and an encryption key from the authentication center, computes a variable M1, M2', and M3 and verifies the validity of the mobile station by comparing variable M2 received from the mobile station with variable M2'.

19. The system recited in claim 15, wherein the mobile station further comprises: a subscriber identification module (SIM) used to compute a signed response and a ciphering key based on a secret key, installed by a home network operator service in the subscriber identification module upon signing up for a service plan, and a random number obtained from an authentication center in the home network operator service; an A3 algorithm module, contained in the SIM, is used to compute the signed response; and an A8 algorithm module, contained in the SIM, is used to compute the ciphering key, wherein through the transmission of signed responses to and from the mobile station a telecommunication infrastructure is able to verify that the mobile station is authorized to access the telecommunication infrastructure and the gateway.

20. A computer program embodied on a computer readable medium and executable by a computer for ordering, paying for and delivering goods and services using a mobile station, comprising:

a Global System for Mobile Communications (GSM) authentication code segment to verify that the mobile station is permitted to access a telecom infrastructure;

a mobile station certificate/signature verification address acquisition code segment to request a signature verification address for the mobile station from a gateway; and a gateway certificate/signature verification address generation code segment to verify that the mobile station is authorized to receive the signature verification address by transmitting an international mobile subscriber identifier received from the mobile station to an authentication center, calculate variables based on information received from the authentication center and compare them to variables computed by the mobile station, and issue the digital certificate to the mobile station when the variables match.

21. The system recited in claim 20, wherein the mobile station certificate acquisition code segment verifies that the gateway is authorized to issue the signature verification address through the use of comparing variables computed by the gateway and the mobile station.

22. The computer program recited in claim 21, further comprising:

a buyer purchase code segment to request the purchase of a good or service from a seller, present the signature verification address to the seller, receive an invoice and provide the seller with a digital signature approval the purchase of the good or service;

a seller sales code segment to verify the validity of the of the digital signature using the signature verification address, issue an authorization request, generate an accounting record and deliver a product or service;

a seller billing code segment to transmit to the gateway the accounting record and receive a response indicating if the accounting record has been approved for payment; and a gateway billing code segment to verify the accounting record and an accompanying signature, and issue a credit to the seller and debit to the buyer when the accounting record and the accompanying signature are verified.

23. The computer program recited in claim 21, wherein the mobile station certificate/signature verification address acquisition code segment transmits a session identification and an international mobile subscriber identifier to the gateway, receives a random number and a variable M1 from the gateway and verifies that the gateway is authentic by computing and comparing the variable M1' with M1.

24. The computer program recited in claim 20, wherein the gateway certificate generation/signature verification address code segment transmits an international mobile subscriber identifier to the authentication center, receives a random number, a service response and an encryption key from the authentication center, computes a variable M1, and M2'.

* * * * *